United States Patent Office 2,957,338
Patented Oct. 25, 1960

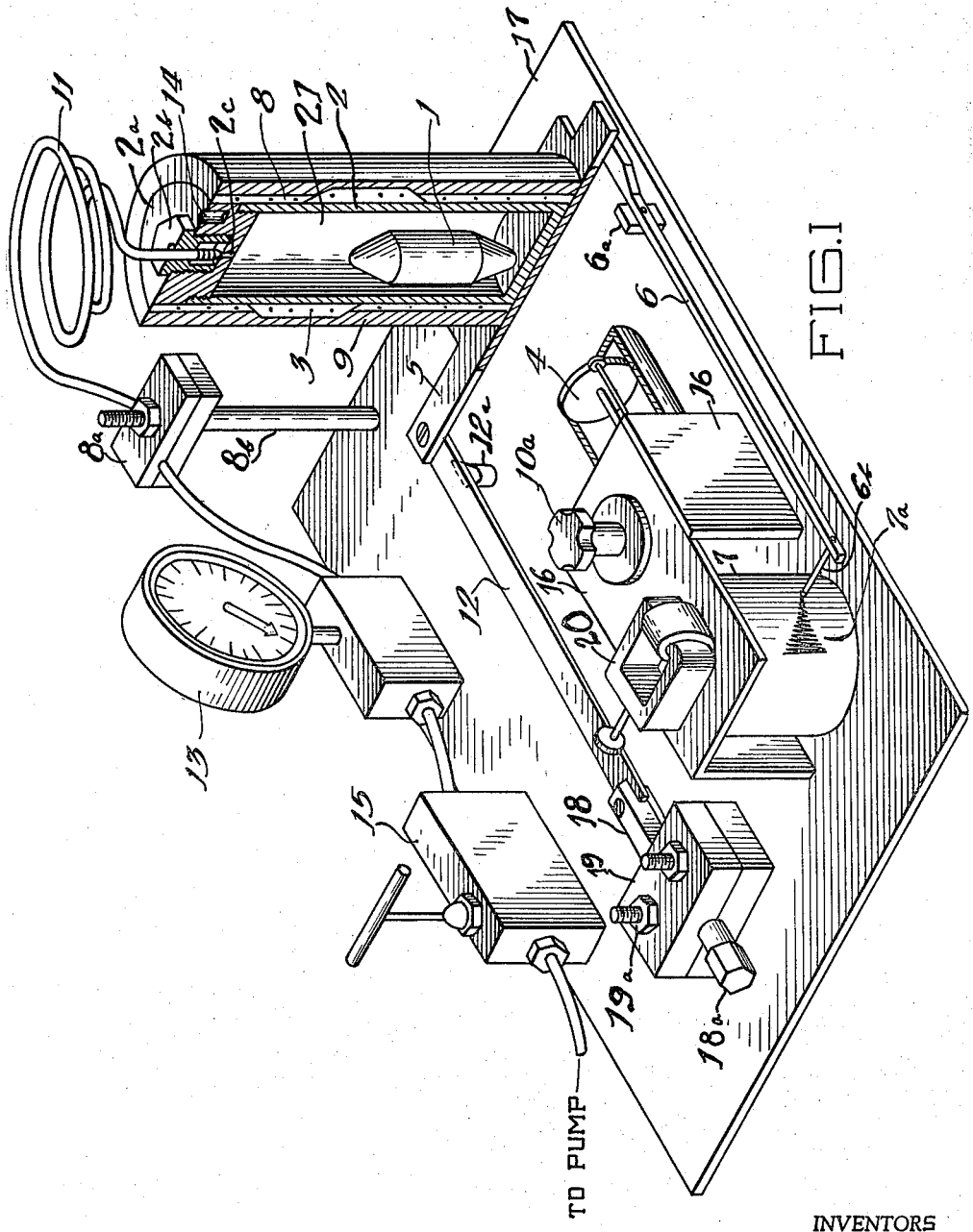

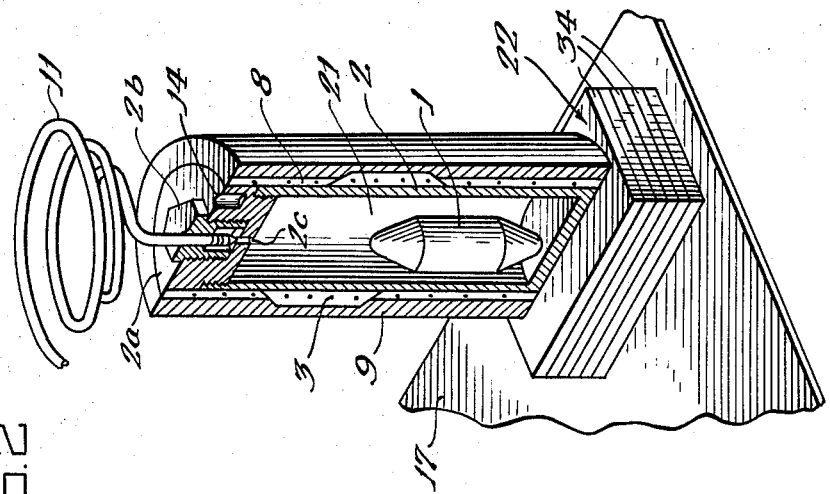
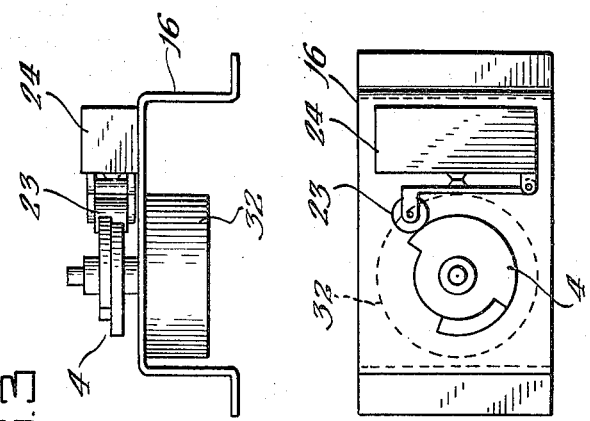
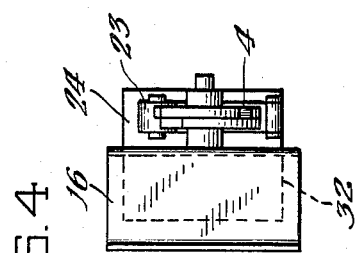

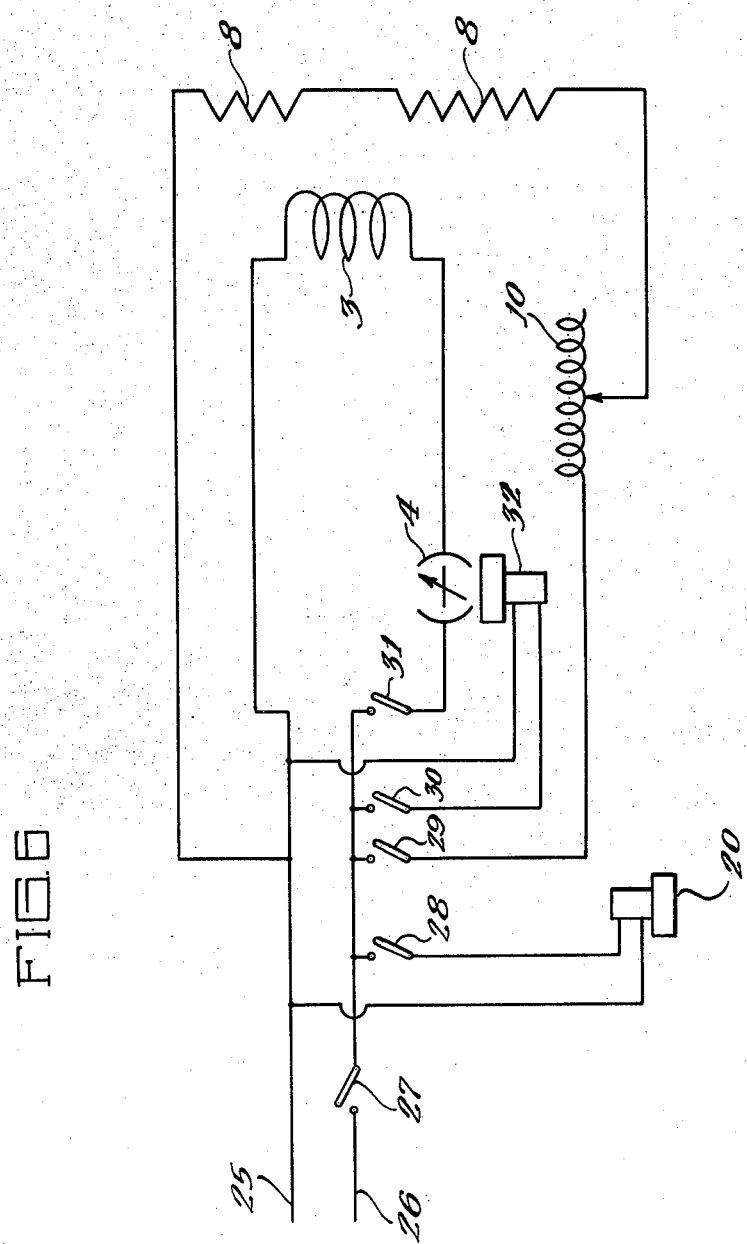

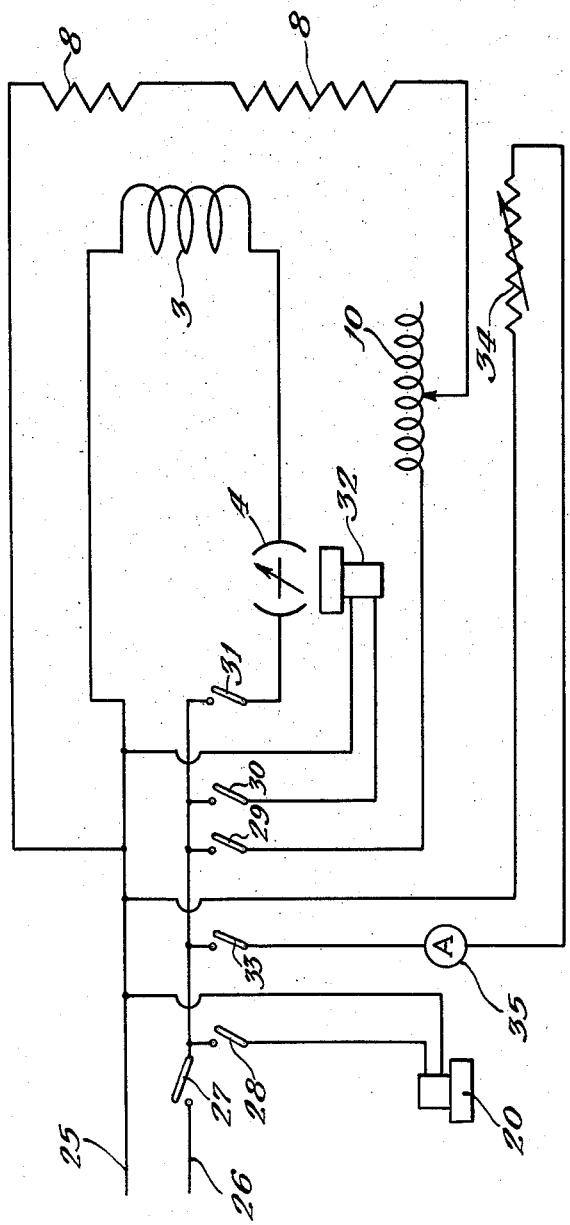

2,957,338

VISCOMETER

Harvey T. Kennedy and Paul B. Crawford, Bryan, Tex., assignors to Great Lakes Carbon Corporation, New York, N.Y., a corporation of Delaware Filed Nov. 29, 1957, Ser. No. 699,825

10 Claims. (Cl. 73—54)

This invention relates to a device for measuring the viscosity of fluids. More particularly, this invention relates to a device for measuring the viscosity of fluids at different pressures and temperatures, and is particularly adaptable to measuring the viscosity or changes in viscosity of fluids which undergo a chemical or physical reaction of change, depending in part upon the pressure and temperature of the fluid.

While our invention is not so limited, it is particularly well adapted for measuring the viscosity of fluid materials commonly used in the oil and gas industry. In connection with the drilling of wells, a variety of fluid compositions are subjected to elevated pressures and temperatures which occassionally cause rapid increases in the viscosity of such fluid compositions which are pumped into the well bores.

In the completion of oil and gas wells, it is common practice to pump a cementiceous slurry down into the well through casing, and force this slurry up through the annulus between the casing and the well bore. This operation is designed to seal off the overlying earth formations from the oil or gas producing zone with set cement. It is common knowledge that a slurry of Portland cement, with or without aggregates or other additives contained therein, tends to thicken and occasionally "flash set" in the well in a relatively short period of time. The deeper the well, the higher will be the temperature and pressure to which the cement slurry is subjected and these conditions aggravate the setting problem.

In view of the foregoing facts, there has been a great need for apparatus which is capable of measuring the change in viscosity of Portland cement slurries and other fluids which will be subjected to high temperature and pressure conditions in wells. These conditions may vary from a thousand to three thousand lbs./sq. inch and from 100° to 250° F., although in very deep wells even more severe conditions are frequently encountered.

Certain forms of apparatus have been devised by others to measure the changes in viscosity of Portland cement slurries under controlled time-pressure-temperature conditions. These devices are, however, very expensive and physically quite cumbersome. To the best of our knowledge, there are no such devices that are readily transportable into the oil fields. They are normally retained in regional laboratories where viscosity tests are made. It is, however, desirable to have a portable viscometer which can achieve the aforementioned results and which can be used on the well site to measure the viscosity of cement slurries samples taken directly from cement trucks just prior to the pumping of the cement slurry into the well for cementing casing.

The devices which have heretofore been used for the above stated purposes are further provided with paddles, agitators or similar means which continuously stir the cement slurry or other well fluid in the testing apparatus over a desired time-pressure-temperature testing cycle. When friable materials such as lightweight aggregates used for sealing or bridging off certain areas in the subterranean formation are incorporated into the cement slurry, these internal mixing devices tend to degrade or abrade such materials and this will have an effect upon the viscosity and setting time of the cement slurry. Therefore, the conventional laboratory devices currently in use cannot give a truly accurate prediction of the viscosity changes of the cement-aggregate slurry under actual well conditions.

Our invention is also adaptable for the study of changes in viscosity of oil well drilling fluids under varying conditions of pressure and temperature. It is also useful in the testing of fluid compositions which are not necessarily connected to the drilling and completion of oil and gas wells. For example, our device can be used in measuring the viscosity of lubricants, whether these be of petroleum base or some other base material, liquid food stuffs such as syrups, molasses, anti-freeze solutions, etc. Our device is further adaptable to measuring the viscosity of such materials at temperatures and pressures either above or below usually prevailing atmospheric conditions.

It is an object of our invention to provide an apparatus for measuring the viscosity of fluids at high or low pressures and temperatures. Another object is to provide an improved apparatus for continuously measuring the viscosity of fluids under the previously stated conditions. It is a further object of our invention to provide an apparatus for measuring the viscosity, at any particular time or during any time interval, of fluids which are characterized by undergoing chemicals or physical reaction or change, depending upon conditions of time, pressure, and temperature. It is a further object of our invention to provide a device for measuring the viscosity of fluids which contain friable materials suspended therein in which the degrading of such materials is minimized or substantially eliminated.

Further objects and advantages of our invention will be apparent from the following detailed description when considered in conjunction with the accompanying drawings.

Figure 1 is a perspective view of our viscometer, with certain features of the invention shown in cross section, and certain features being represented schematically or diagrammatically.

Figure 2 is a perspective view of a modified viscometer of the present invention, also with certain features shown in cross section.

Figures 3, 4 and 5 are different views of the interrupter or timer mechanism designated generally as 4 in Figure 1.

Figure 6 is a schematic view of an electrical circuit which is employed in conjunction with the viscometer shown in Figure 1.

Figure 7 is a schematic view of an electrical circuit which is employed in conjunction with the viscometer shown in Figure 2.

In a broad embodiment our invention comprises a device for measuring the viscosity of a fluid comprising in combination a resiliently mounted or supported nonmagnetic container for the fluid, means for establishing a magnetic field in a defined area or portion of said container, means responsive to said magnetic field positioned within said container and freely movable in the fluid, and means for measuring the movement of the container when a magnetic field is established.

Referring now to the drawings, there is shown in Figure 1, one specific embodiment of our viscometer which comprises a base member or panel 17 which can be of steel, wood or other construction. Pivotally mounted on the base 17 is a support member which, in the preferred embodiment illustrated in the drawing, consists of a torsion bar 12 and movable support arm 5. The torsion bar 12 and support arm 5 are in a plane substantially parallel with the base 17 and are supported above the base by means of torsion bar support member 18 which in turn is fixed to the base 17 by means of a clamp 19 secured by fastening bolts 19a. Additionally, the torsion bar 12 is supported on the base 17 by means of a pivot support member 12a adjacent to the point where the support arm 5 and torsion bar 12 are joined. Vertically mounted on the support arm 5 is a container or pressure vessel 2 having an interior sample chamber 21 and is preferably provided with suitable exterior insulation 9. In a medial portion of the container is provided a means for establishing a magnetic field such as a solenoid winding 3. The container 2 is constructed of non-magnetic material, i.e. material which will not substantially interfere with the transmission of magnetic flux. The stop of the container 2 is provided with a closure 2a which will hold any predetermined pressure within the container.

Inside the container 2 is placed means responsive to the magnetic field established by the solenoid, such as a core 1 which will have an appreciable viscous drag when it rises and falls in the fluid. Preferably, core 1 consists of a cylinder of soft iron with a rounded point at each end, but it should be understood that the invention is not limited to this particular armature configuration. The core 1 is freely positioned in the sample chamber 21 and can move up and down inside the container in response to the lifting action of the solenoid 3 when the latter is electrically energized. As shown in Figure 6, the solenoid 3 is periodically actuated by an electric current by means of an interrupter 4, the details of which are shown in Figures 3, 4 and 5 and which are hereinafter described. A conventional clock motor mechanism 20 (shown schematically) drives the recording drum 7 on which is placed suitable recording chart paper 7a. In contact with the movable support arm 5 is a recording arm 6 which is pivotally supported from the base 17 by means of recording arm pivot support 6a. Attached to the end of recording arm 6 is a pen stylus 6b which is maintained in contact with the chart 7a on the clock-actuated recording drum 7.

In the event that it is desired to use the viscometer of our invention for measuring viscosities at elevated or reduced temperatures or pressures, our device is equipped with a heating coil 8, and a fluid-transmitting coil 11 which communicates with the sample chamber 21 of the container 2 through the cap pressure closure 2a by means of sealing member 2b and a channel 2c. The coil 11 is secured to the base 17 by means of a clamp 8a and clamp support 8b. A pump (not shown) is connected to coil 11 through valve 15, and there is further provided a pressure gauge 13 to measure either positive or negative pressures in the sample chamber 21. Additionally, the container 2 is provided with means for measuring the temperature of the fluid in sample chamber 21, for example, a thermometer well 14 in which, preferably, a bi-metallic thermometer is employed and which is connected to a recorder (not shown) to measure the temperature of the fluid sample at any given time or over a given time interval. In order to supply energy to heating coil 8 there is shown a transformer knob 10a for a conventional variable transformer 10 (shown in Figure 6) and fixed to the base 17 by means of support member 16, the latter also serving to support the clock motor mechanism 20, recording drum 7 and solenoid circuit interrupter 4.

Also in Figure 1, when fluids of different densities are to be placed in sample chamber 21, the recording arm 6 will assume different positions on the chart 7a and might even conceivably cause the stylus 6b to go off the deflection recording chart 7a. This problem is solved by adjusting the flexible support member, consisting of torsion bar 12 and support arm 5, so that the stylus 6b will be set at a predetermined "zero" position, by means of the clamping arrangement 18a and 19; or alternatively, by adjusting the recording arm support 6a.

In operation, our invention measures the variation in the viscosity or "stiffness" of the fluid in sample container 21 with time, under any predetermined schedule of pressure and/or temperature. The sample container 21 is filled with the fluid under test, such as a Portland cement slurry with an aggregate suspended therein which is to be used in cementing casing in a well bore. The transformer knob 10a is set at a position so that the temperature of the sample will be raised to a desired point. If desired, fluid is pumped through valve 15 and the coil 11 into the sample chamber to give any desired pressure. The torsion bar 12 is adjusted by turning torsion bar support member 18 and 18a in the clamp 19 so that the stylus 6b on the recording arm 6 will be placed at a "zero" setting, preferably in the center of the chart 7a. The clock motor 20 which actuates the recording drum 7, and the interrupter 4, driven by interrupter motor 32 (Figure 6), are then started. The cycles or speeds of these two motors are suitably synchronized. A convenient rate for the interrupter is about 1 cycle every 5 seconds, but obviously this may be varied as desired. When the solenoid winding 3 is periodically electrically energized by interrupter 4 a magnetic field is established in a defined, usually medial area of the vessel 2. This causes the core 1 to be accelerated from the bottom of the vessel into the magnetic field. Correspondingly, the resiliently mounted container 2 is drawn downwardly towards the upwardly rising core, thereby establishing an unbalanced reaction against the flexible, resilient support member 5. The downward movement of support arm 5 will cause the end of the recording arm 6 which carries the stylus 6b to move upwardly and make an appropriate lined record on the chart 7a on the moving recording drum 7. When the interrupter 4 deenergizes the solenoid 3, the support arm 5, recording arm 6 and stylus 6b will return to their normal position or "zero" setting. As the interrupter 4 intermittently electrically energizes the solenoid 3, the support arm 5 will deflect downwardly and the recording arm 6 will deflect upwardly. The magnitude of the upward deflection of arm 6 is recorded by stylus 6b and will be an inverse function of the resistance to flow of the fluid surrounding core 1. There will, of course, be a correspondingly downward deflection of recording arm 6 caused by the deacceleration of the core 1 on returning to its normal position in the container 2 when the solenoid is deenergized by the interrupter 4.

The record thus obtained shows the viscosity or resistance to flow of the fluid at any given time, and the chart deflection lines on the chart can be calibrated in any desired units. When the fluid in sample chamber 21 becomes stiff enough to prevent the movement of core 1 when the solenoid 3 is electrically energized, there will be no deflection of recording arm 6 and the record on the chart 7a will show a horizontal straight line.

The term "resiliently mounted" when used herein and in the appended claims in connection with the fluid container is deemed to include supports other than the one described in the preceding specific embodiment and as further exemplified by the drawing of Figure 1. Other supports or mountings for the container may be used provided that they are movable in an upward-downward motion, or are similarly elastic or compressible, and other means may be employed for recording such movement, the latter means being either electrical, mechanical, or electromagnetic.

For example, in place of the support member consisting of torsion bar 12 and support arm 5 of Figure 1, we can use other resilient, i.e. elastic and/or compressible mountings and in connection therewith, means other than the recording arm 6 and pin stylus 6b may be used for indicating or recording the movement of such supports or mountings when the container 2 is moved upon energizing the solenoid 3 and in response to the movement of the core 1. Therefore, we contemplate as being within the scope of our invention the use of an electrical transducer, such as a carbon pile, upon which the container 2 is mounted or supported, such a transducer is shown schematically in Figure 2. In principle, such transducer consists of a conductor 22, which may be a series or plurality of plates 34, as exemplified in a carbon pile, through which is impressed or passed a constant voltage. Connected to the transducer by either electrical or electromechanical means is a meter 35 (Figure 7) or recording chart which indicates the current being passed through the transducer at any given time. When the container 2 containing the fluid whose viscosity is to be measured, is placed upon the transducer 22, and a constant voltage (such as from power lines 25 and 26, through switches 27 and 33 of Figure 7), is impressed across the transducer, the electrical current will vary measurably when the solenoid coil 3 is periodically energized and the core 1 is accelerated into the magnetic field. The resistance across the transducer is directly proportional to the acceleration and deceleration of the core 1 when the latter is moving through the fluid, and this resistance may be measured by recording with meter 35 the current flowing through the transducer. When there is no motion of the core 1, i.e. when the viscosity of the fluid has reached a maximum and prevents movement of the core, the electrical current record will be a straight line such as is produced under similar conditions in the case of the embodiment shown in Figure 1. A suitable carbon pile transducer is described in Catalog J200 published in 1958 by the Central Scientific Company, Chicago, Illinois, at page 234, Catalog No. 82905.

The electrical circuits of Figures 6 and 7 employed in conjunction with the devices exemplified in Figures 1 and 2 have already been partially described in some detail. Numbers in these figures which are common with numbers of Figures 1 or 2 are, of course, for the same elements. In addition, 25 and 26 are power lines normally carrying 110 volts, 60 cycle alternating current; the transducer is made up of carbon plates 34; 27, 28, 39, 30 and 31 are switches to energize the main circuit, the clock motor 20, the transformer 10 for the heater 8, the interrupter motor 32 and the solenoid coil 3, respectively; 33 is a switch to energize the transducer 22 and 35 is a meter to measure the current flowing through the carbon plates 34 of the transducer.

The interrupter 4 is a conventional timing device for periodically and regularly energizing solenoid 3. It is shown in detail in Figures 3, 4 and 5 in order that its utilization in the present setting may be clearly understood. The interrupter 4 is actually an adjustable split cam which is driven by an electric motor 32 at a pre-determined rate. As the cam 4 revolves, it exerts a tension against spring arm roller 23 during part of its cycle, causing the contacts of microswitch 24 to close and energize the solenoid for the desired period of time, depending on the rate of revolution and the settings of the cam. The interrupter unit may conveniently be mounted on support member 16. A suitable 60 cycle, 115 volt device is manufactured and sold by Herbach & Rademan, Inc., Philadelphia, Pennsylvania, and is illustrated on page 7 of their catalog for March-April 1956, under Catalog No. HR-009.

Valve 15 is supplied by the American Instrument Company. The transformer 10 is a Powerstat Type 116, 120 c.p.s. (0 to 140 output voltage) unit manufactured by the Superior Electric Company, Bristol, Connecticut. Suitable clock motors 20 and recorders are described in "Instruments for Measurement and Control," by W. G. Holzbock, Reinhold Publishing Corporation (1955), page 51, and in the February 15, 1958, parts manual for recording charts published by Minneapolis-Honeywell, page PL15-078.

In place of the heating coil 8 shown in Figures 1 and 2, a cooling coil may be substituted through which is passed water, or a fluid or gaseous refrigerant.

While we have described our invention in connection with certain specific embodiments thereof showing certain convenient features and equipment, we do not wish to limit ourselves to such specific features but only by the scope of the following claims.

We claim:

1. A device for measuring the viscosity of a fluid comprising in combination a resiliently mounted substantially non-magnetic container for the fluid, means for establishing a magnetic field in a portion of said container, means having an appreciable viscous drag and being responsive to said field positioned within said container and freely movable in the fluid, and means for measuring the movement of the container when a magnetic field is established.

2. A device for measuring the viscosity of a fluid comprising in combination a resiliently mounted substantially non-magnetic container for the fluid, a solenoid winding surrounding a medial portion of said container, a solenoid core positioned and freely movable in the fluid within said container, means for intermittently electrically energizing said winding whereby said core is caused to move into the resultant magnetic field, and means for measuring the movement of the container caused by the action of said field upon said core when the solenoid is energized and the core moves through the fluid into said field.

3. A device for measuring the viscosity of a fluid comprising in combination a substantially non-magnetic container mounted on a resilient support member, means for intermittently establishing a magnetic field in a medial portion of said container, means having an appreciable viscous drag and being responsive to said field being positioned within said container and freely movable in the fluid, and means for recording the deflection of said support member caused by movement of the container when a magnetic field is established.

4. A device for measuring the viscosity of a fluid comprising in combination a substantially non-magnetic container for the fluid mounted on a pivoted, movable support member, a solenoid winding surrounding a medial portion of said container, a solenoid core positioned in and freely movable in the fluid within said container, means for intermittently electrically energizing said winding whereby said core is caused to move into the resultant magnetic field, and means for recording the deflection of said support member caused by movement of the container when a magnetic field is established by the electrical energizing of the solenoid winding.

5. A device according to claim 4 wherein the container is provided with means for heating the container to any predetermined temperature, and with means for recording the temperature of the fluid in the container.

6. A device according to claim 4 in which the container is provided with means for pressurizing the interior and the contents of the container, and with means for recording the pressure within the container.

7. A device for measuring the viscosity of a fluid comprising in combination a substantially non-magnetic container for the fluid mounted on a pivoted, movable support member, a solenoid winding surrounding a medial portion of said container, a solenoid core positioned and freely movable in the fluid within said container, means for intermittently electrically energizing said winding whereby said core is caused to move into the resultant magnetic field, means for recording the deflection of said support member caused by movement of the container when a magnetic field is established by the electrical energizing of the solenoid winding, and means for adjusting the position of the container and its support member with respect to a fixed, predetermined position on said recording means depending upon the density of the fluid placed in the container.

8. A device according to claim 2 wherein the container is supported on an electrical transducer, the latter being provided with means for indicating the varying electrical resistance of the transducer as a result of the movement of the container when the solenoid is energized and the core moves through the fluid into the magnetic field.

9. A device according to claim 2 wherein the container is supported on a carbon pile electrical transducer which is provided with electrical means for indicating the varying resistance of the carbon pile resulting from the movement of the container caused by the action of the magnetic field upon the core when the solenoid is energized and the core moves through the fluid into the field.

10. A device for measuring the viscosity of a fluid whose viscosity changes under different pressure and temperature conditions comprising in combination a substantially non-magnetic container for the fluid, electromagnetic winding means for establishing a magnetic field in a medial portion of a cavity in said container, means having an appreciable viscous drag and being responsive to said field positioned within said cavity and freely movable in the fluid, means for intermittently and regularly electrically energizing said winding whereby said electromagnetically responsive movable means is caused to move into the resultant magnetic field, means associated with the foregoing elements for sensing variations in the viscosity of the fluid as it changes from one value to other values and means for recording said varied viscosities.

References Cited in the file of this patent

UNITED STATES PATENTS

| 1,270,800 | Edgecomb | July 2, 1918 |
| 2,273,750 | Clagett | Feb. 17, 1942 |

OTHER REFERENCES

MacInnes, Dayhoff, and Ray, "A Magnetic Float Method for Determining the Densities of Solutions," August 1951, published in The Review of Scientific Instruments, volume 22, number 8, pages 642–646.